(12) United States Patent
Shimamori et al.

(10) Patent No.: US 12,546,805 B2
(45) Date of Patent: Feb. 10, 2026

(54) SAMPLE INSPECTION APPARATUS

(71) Applicant: Hitachi High-Tech Corporation, Tokyo (JP)

(72) Inventors: Tomoko Shimamori, Tokyo (JP); Yasuhiko Nara, Tokyo (JP); Junichi Fuse, Tokyo (JP); Akira Kageyama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 127 days.

(21) Appl. No.: 18/560,608

(22) PCT Filed: May 21, 2021

(86) PCT No.: PCT/JP2021/019365
§ 371 (c)(1),
(2) Date: Nov. 13, 2023

(87) PCT Pub. No.: WO2022/244235
PCT Pub. Date: Nov. 24, 2022

(65) Prior Publication Data
US 2024/0255556 A1    Aug. 1, 2024

(51) Int. Cl.
*G01R 23/12*  (2006.01)
*G01N 23/2251*  (2018.01)
(Continued)

(52) U.S. Cl.
CPC ......... *G01R 23/12* (2013.01); *G01N 23/2251* (2013.01); *G01R 1/06766* (2013.01);
(Continued)

(58) Field of Classification Search
CPC ..... G01N 29/075; G01P 3/565; G01R 23/005; G01S 1/306; G05B 1/00
See application file for complete search history.

(56) References Cited

U.S. PATENT DOCUMENTS 5,665,968 A * 9/1997 Meisburger ......... H01J 37/3005
250/306
2006/0113469 A1* 6/2006 Baba ..................... G01Q 10/06
250/310
(Continued)

FOREIGN PATENT DOCUMENTS

JP   2002-26100 A    1/2002
JP   2002-296314 A   10/2002
(Continued)

OTHER PUBLICATIONS

International Search Report (PCT/ISA/210) issued in PCT Application No. PCT/JP2021/019365 dated July 27, 2021 with English translation (4 pages).

(Continued)

*Primary Examiner* — Tung X Nguyen
(74) *Attorney, Agent, or Firm* — Crowell & Moring LLP

(57) ABSTRACT

Provided is a sample inspection apparatus capable of identifying a capacitive fault or a potential faulty point where an electrical tolerance is low. The sample inspection apparatus includes: a charged particle optical system configured to irradiate a sample 19 with a charged particle beam; a first probe 21a configured to come into contact with the sample; an amplifier 23 having an input terminal to which the first probe is connected; and a phase detection unit 40 to which an output signal of the amplifier is input, in which an AC voltage is applied to the first probe, and the phase detection unit detects the output signal of the amplifier using a reference signal synchronized with the AC voltage and having the same frequency as the AC voltage.

12 Claims, 10 Drawing Sheets

(51) Int. Cl.
    *G01R 1/067*     (2006.01)
    *G01R 1/28*     (2006.01)
    *G01R 31/305*     (2006.01)
    *H01J 37/22*     (2006.01)

(52) U.S. Cl.
    CPC ............. *G01R 1/28* (2013.01); *G01R 31/305* (2013.01); *H01J 37/222* (2013.01); *H01J 2237/221* (2013.01)

(56) References Cited

U.S. PATENT DOCUMENTS

| | | |
|---|---|---|
| 2013/0119999 A1 | 5/2013 | Obuki et al. |
| 2017/0234792 A1 | 8/2017 | Ito et al. |
| 2018/0246166 A1 | 8/2018 | Kageyama et al. |
| 2020/0075287 A1 | 3/2020 | Jen et al. |

FOREIGN PATENT DOCUMENTS

| | | |
|---|---|---|
| JP | 2012-33604 A | 2/2012 |
| JP | 2013-187510 A | 9/2013 |
| JP | 2017-147274 A | 8/2017 |
| WO | WO 2017/038293 A1 | 3/2017 |

OTHER PUBLICATIONS

Japanese-language Written Opinion (PCT/ISA/237) issued in PCT Application No. PCT/JP2021/019365 dated July 27, 2021 with English translation (5 pages).

\* cited by examiner

[FIG. 1]
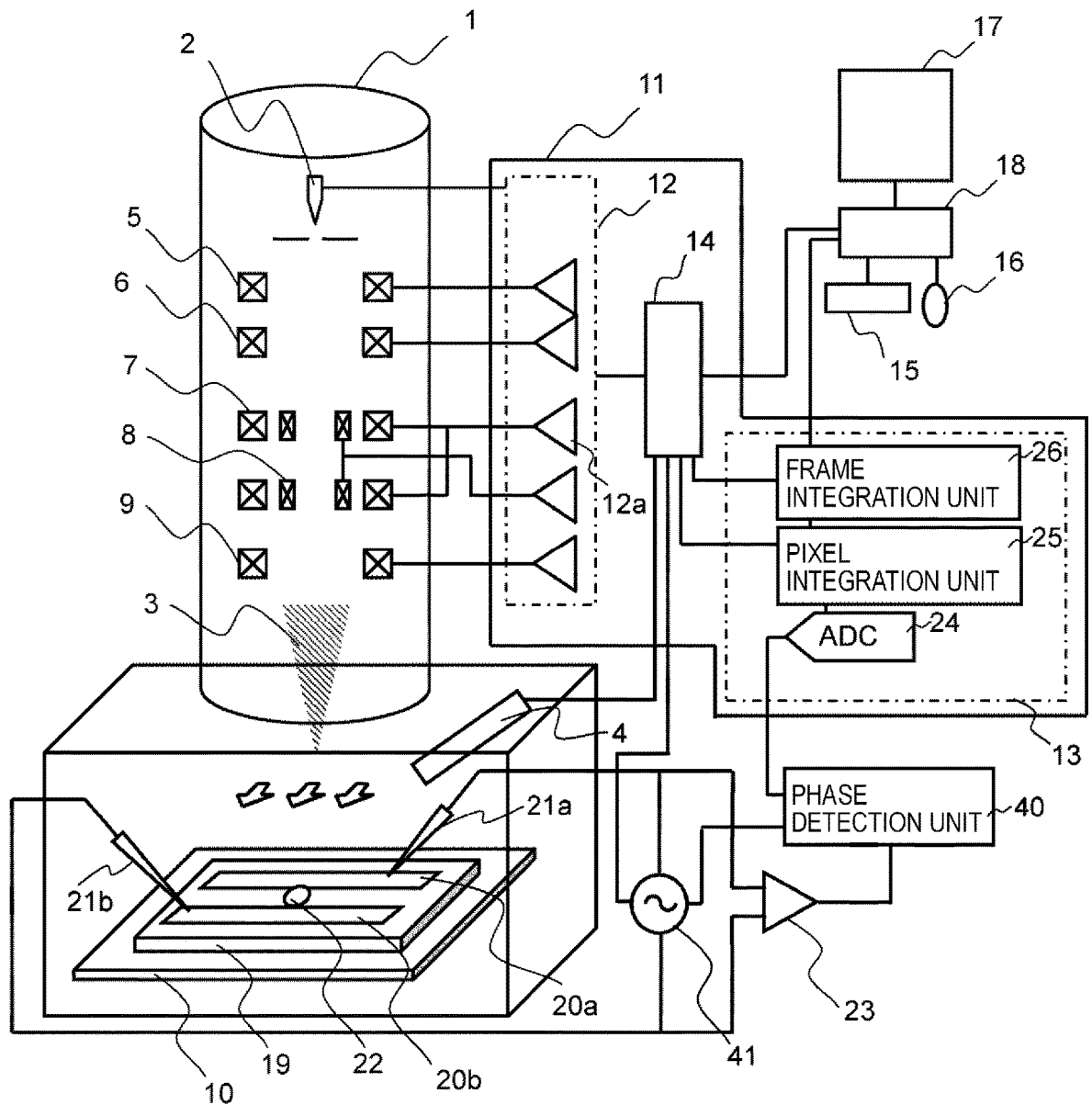

[FIG. 2]
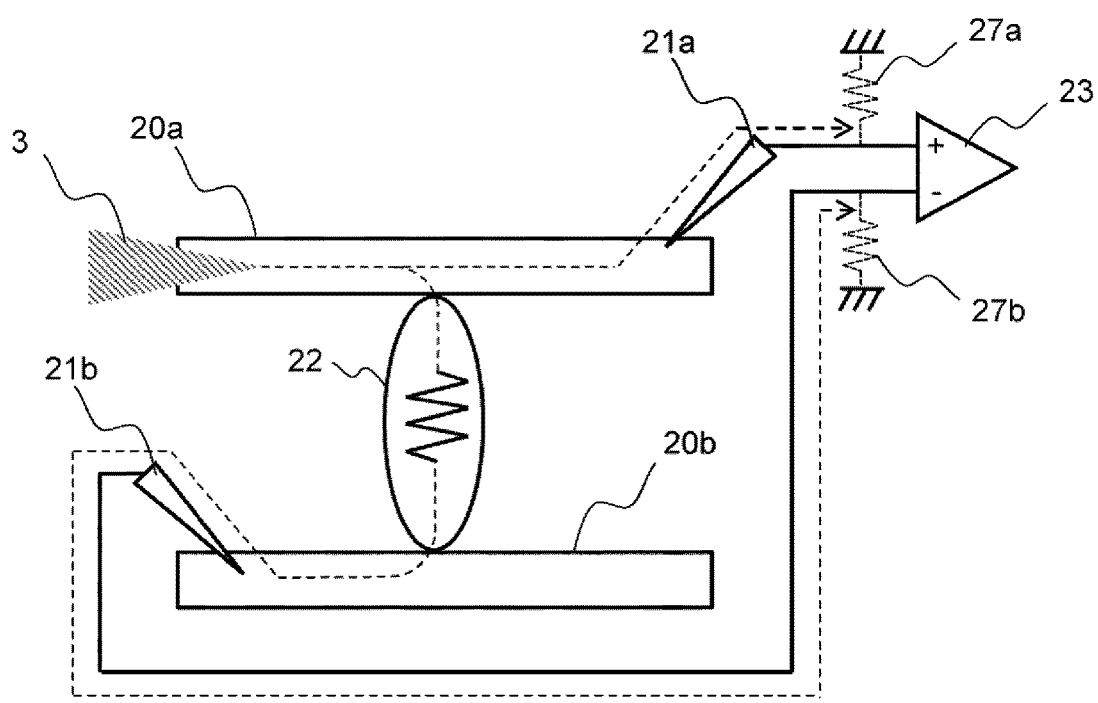

[FIG. 3]
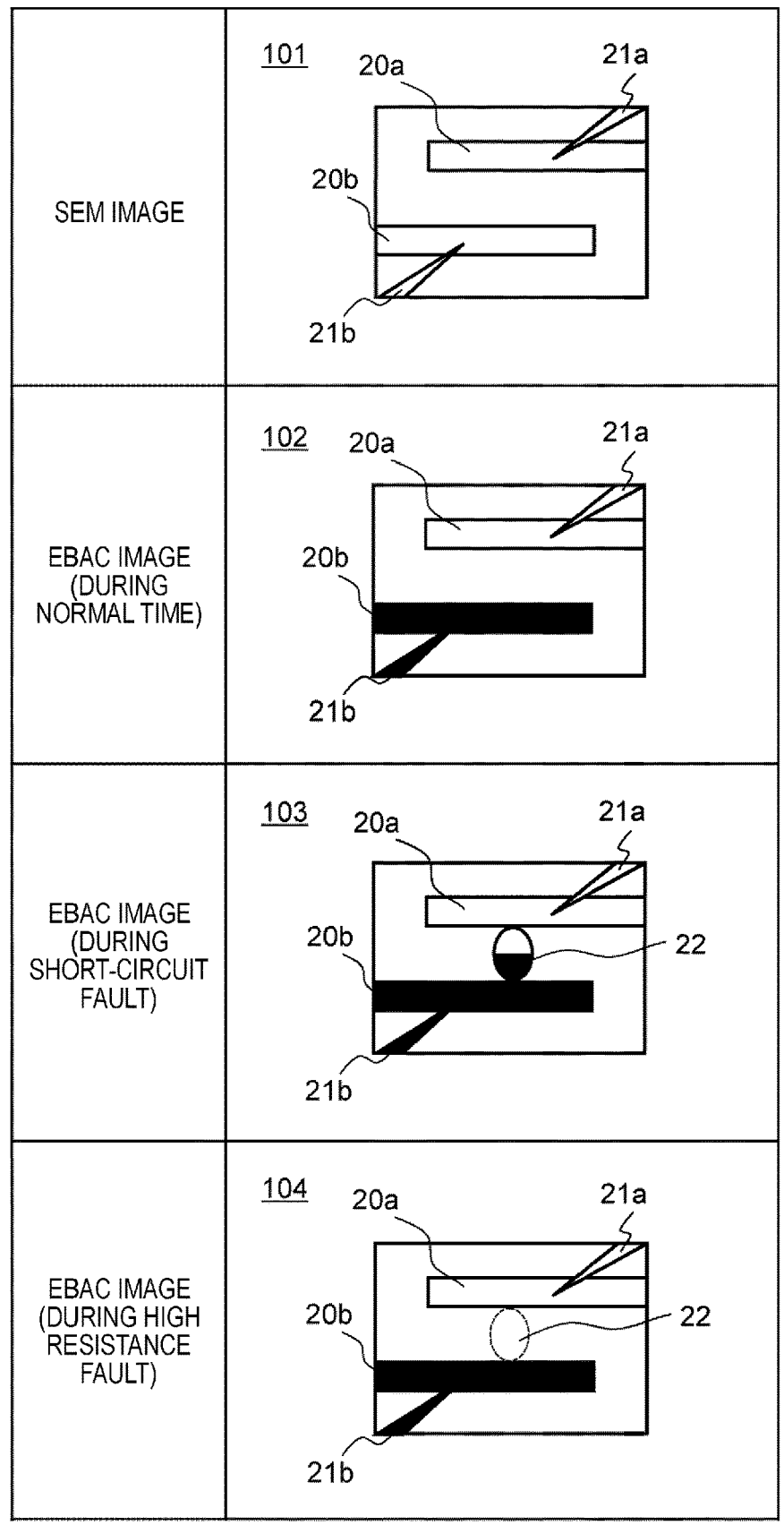

[FIG. 4]
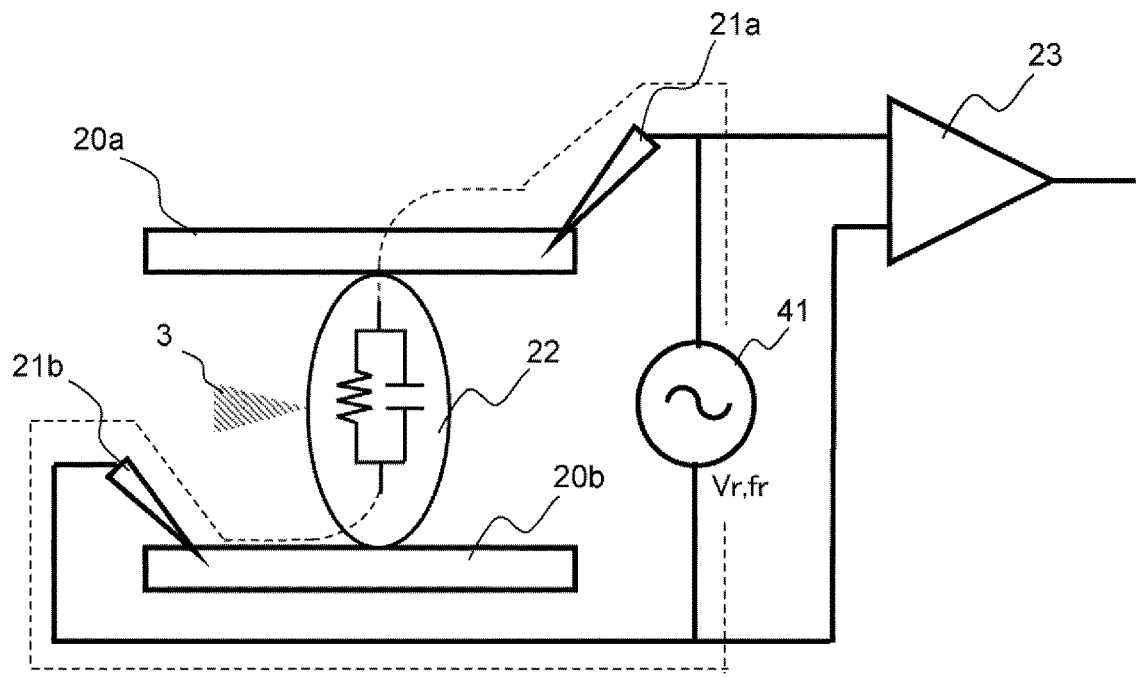

[FIG. 5]
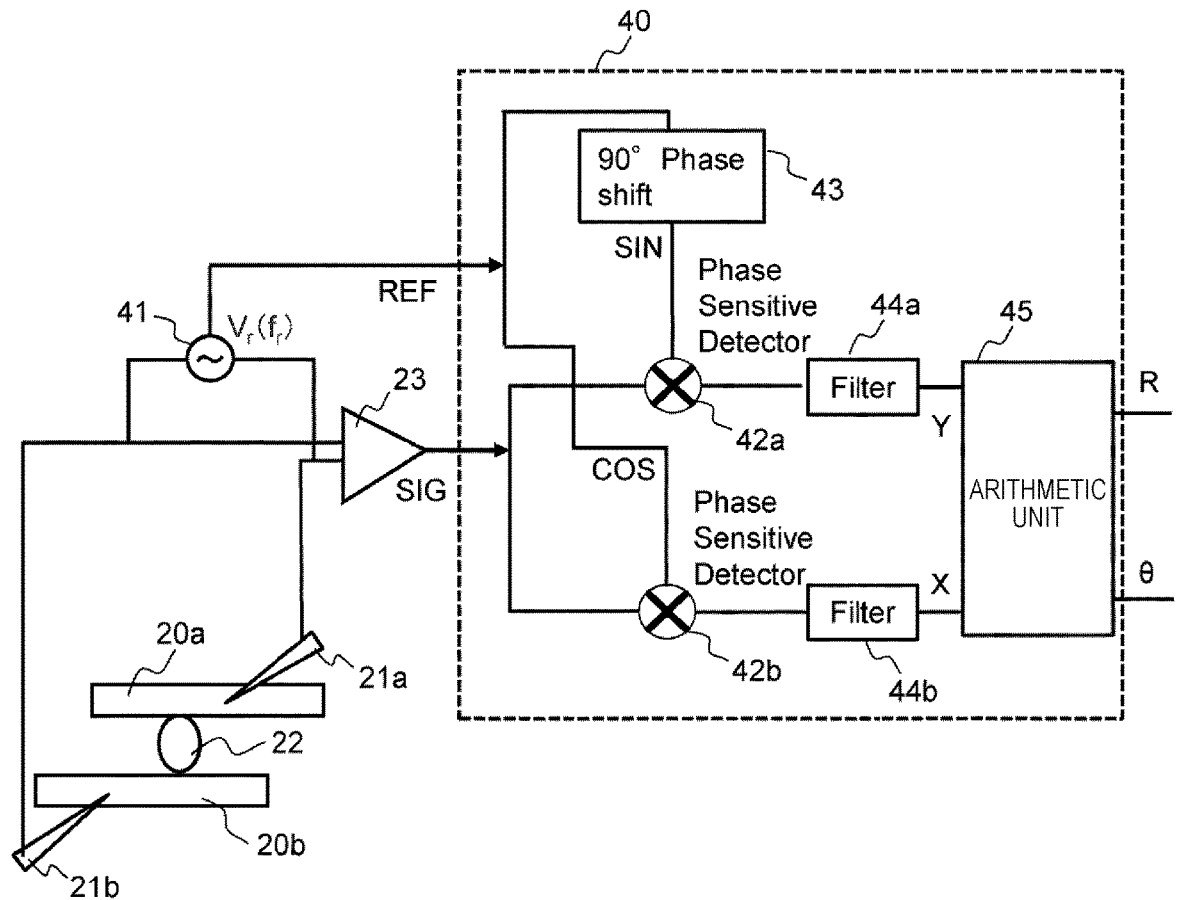
[FIG. 6]
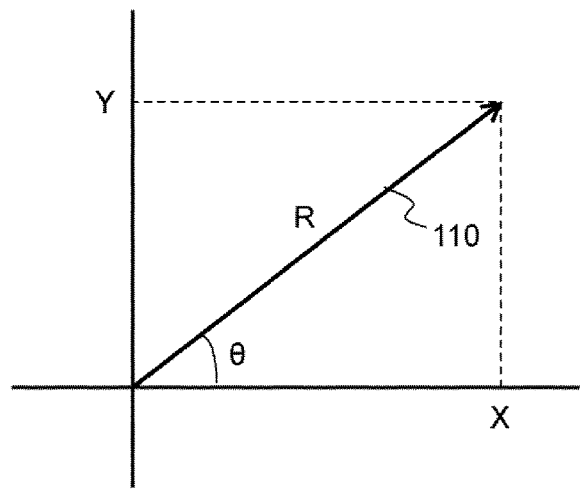

[FIG. 7]
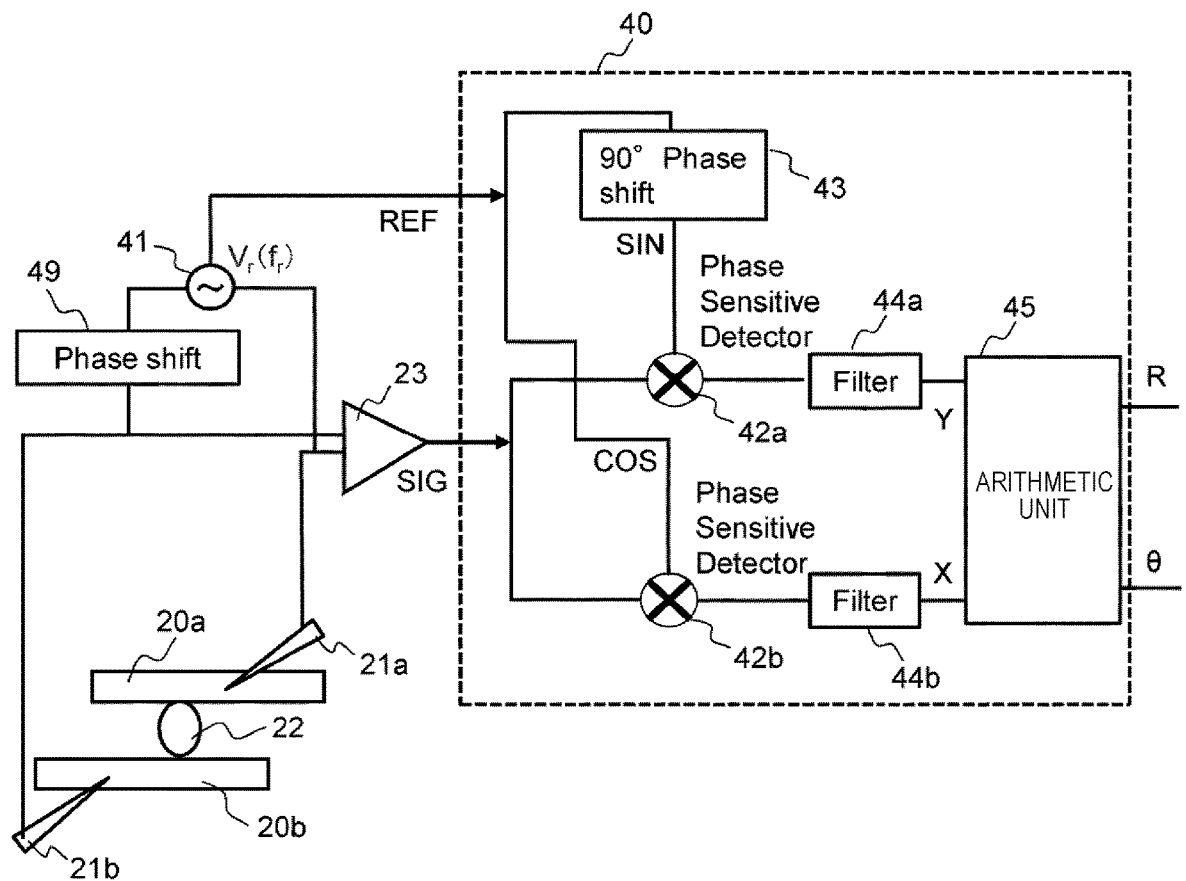

[FIG. 8]
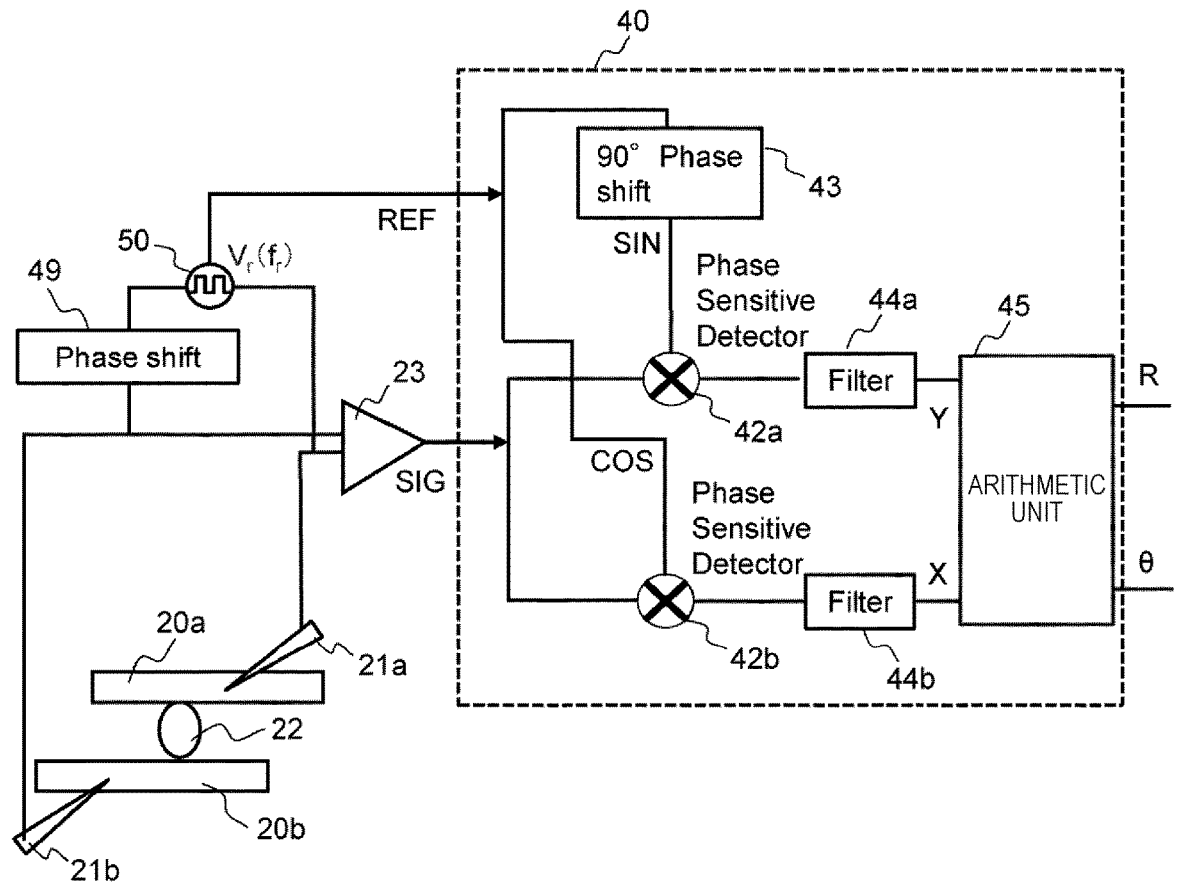
[FIG. 9]
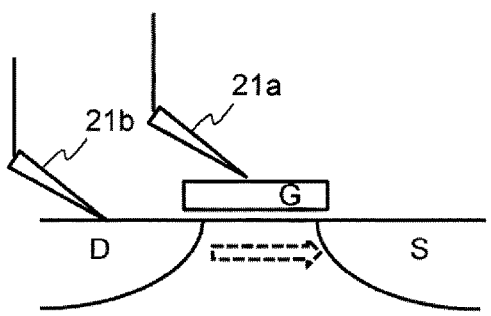

[FIG. 10]
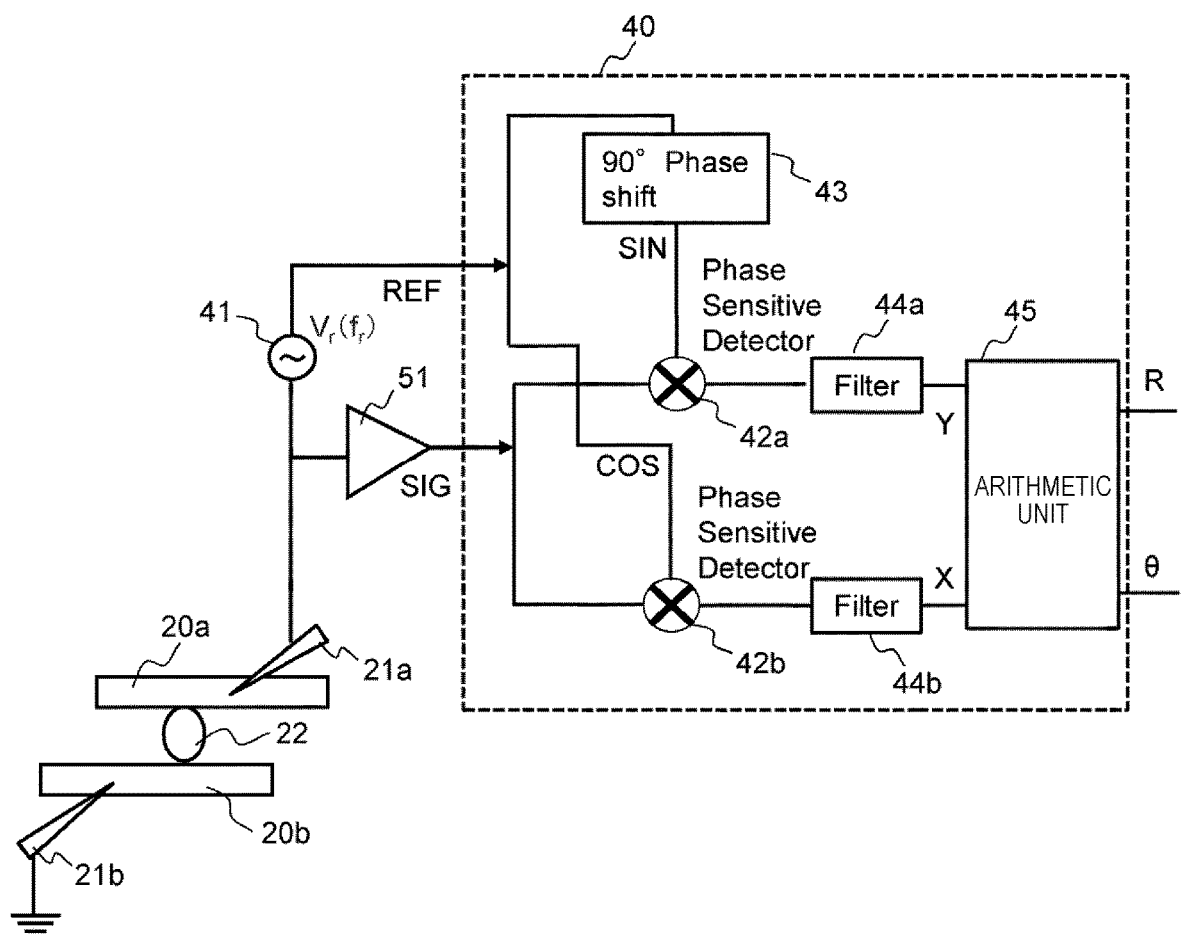

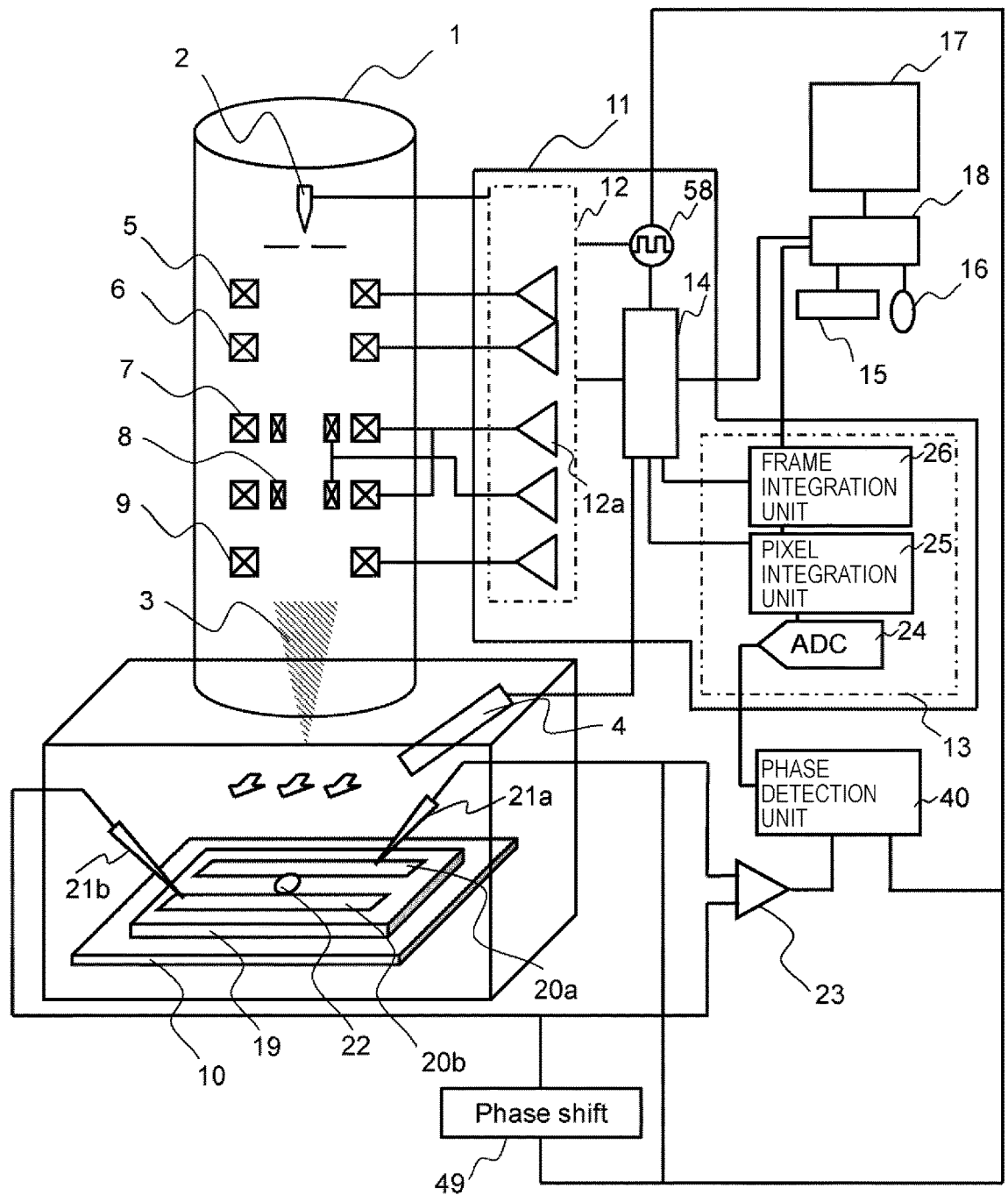
[FIG. 11]

[FIG. 12]
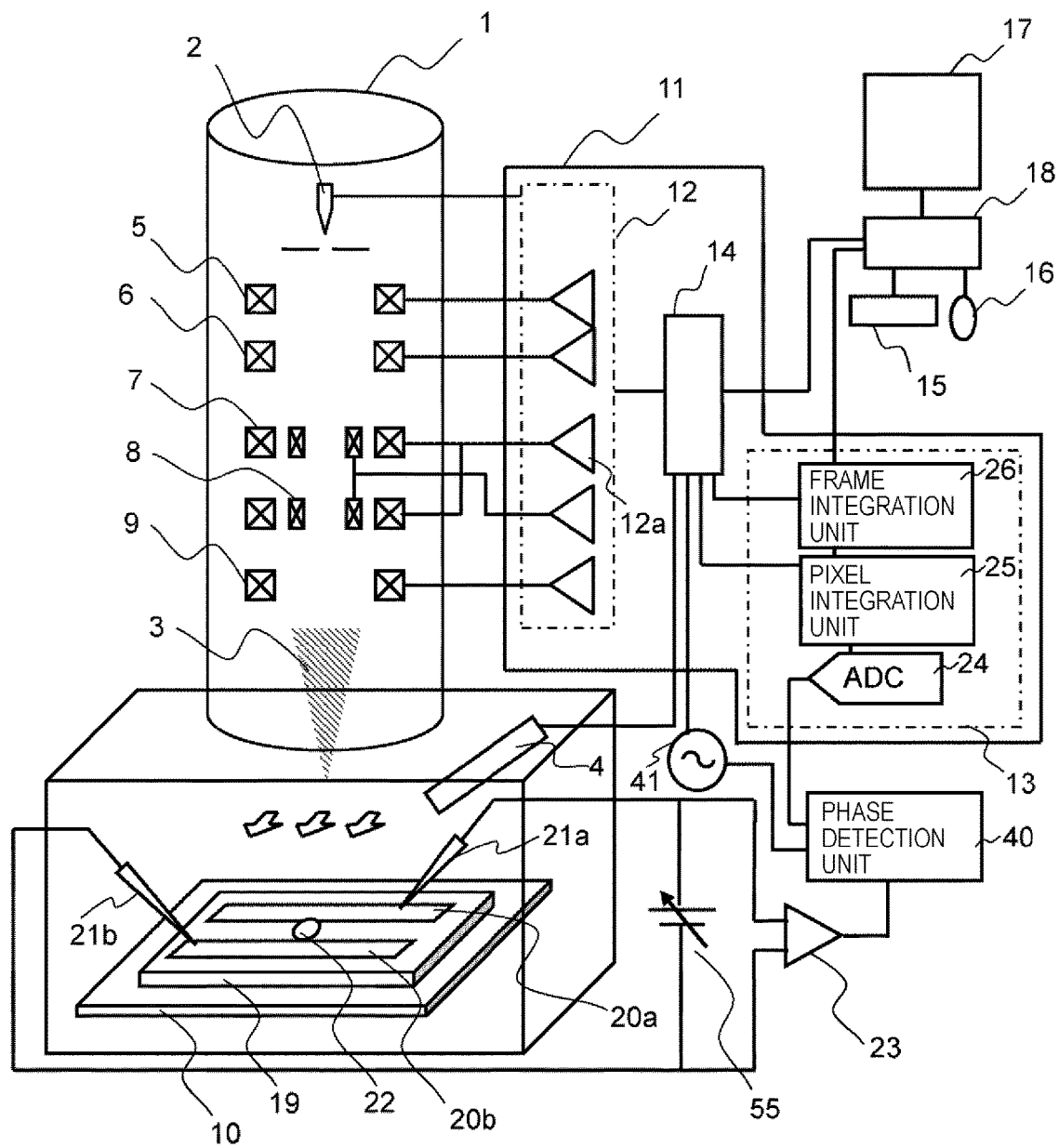

SAMPLE INSPECTION APPARATUS

TECHNICAL FIELD

The present invention relates to a sample inspection apparatus that brings at least one probe into contact with a sample such as a semiconductor on which a circuit is formed and irradiates the sample with a charged particle beam to analyze a fault in the circuit identified by the contact of the probe.

BACKGROUND ART

In the fault analysis of the semiconductor sample having a semiconductor surface on which the circuit is formed, it is important to identify the faulty point. On the other hand, it becomes difficult to identify the faulty point along with a recent reduction in the size of the device. As a result, an enormous amount of time is required for the fault analysis. Currently, an analyzer such as an OBIRCH (Optical Beam Induced Resistance Change) or EB (Electron Beam) tester is used for this type of fault analysis.

In particular, in a field relating to fault analysis of a wiring, a technique of irradiating a semiconductor sample with a charged particle beam represented by an electron beam and brining a probe into contact with the sample such that a current absorbed by the wiring or a secondary signal (for example, secondary electrons or backscattered electrons) emitted from the semiconductor sample is analyzed and imaged has attracted attention. A distribution image of a signal (absorbed current signal) obtained based on the current (absorbed current) absorbed by the wiring is called an electron beam absorbed current image (EBAC image).

PTL 1 discloses a technique in which, using a sample inspection apparatus that outputs an absorbed current output from two probes during scanning of an electron beam as an absorbed current image in conjunction with the scanning of the electron beam, a change in resistance value that occurs when a faulty point in a wiring section of a sample to which the two probes are electrically connected is irradiated with an electron beam is detected as a change of a ratio between resistance values of a normal point and a faulty point to specify the faulty point.

PTL 2 discloses a technique in which at least one probe is brought into contact with a sample on which a circuit is formed, the sample is scanned with a charged particle beam while power is supplied via the probe to the circuit identified by the contact of the probe, and a change in the resistance value of a fault that is locally heated by the charged particle beam is measured via the probe to identify the faulty point.

CITATION LIST

Patent Literature

PTL 1: JP2012-033604A
PTL 2: WO2017/038293A

SUMMARY OF INVENTION

Technical Problem

In the EBAC image in the related art, it may be difficult to distinguish between a faulty point and a normal point depending on a sample state such as a material where short-circuit occurs or the size of a resistance value of a faulty point. The present inventors particularly focused on a faulty point that does not substantially appear as a change in resistance value. The EBAC signal of the fault is buried in a noise component of a bias current, and it is difficult to detect the faulty point.

A principle of forming the EBAC image will be described using FIG. 2. FIG. 2 illustrates a state where a semiconductor sample having a surface on which conductors 20a and 20b are formed is irradiated with an electron beam 3. Probes 21a and 21b are connected to a positive input terminal and a negative input terminal of a differential amplifier 23, the probe 21a is in contact with the conductor 20a, and the probe 21b is in contact with the conductor 20b.

When the conductor 20a is irradiated with the electron beam 3 with which the sample surface is being scanned, charge from the electron beam 3 is transmitted to the probe 21a and is input to the positive terminal of the differential amplifier 23. Here, when a faulty point 22 having one resistance value is in contact with the conductor 20a and the conductor 20b, charge flows to the conductor 20b through the faulty point 22, is transmitted to the probe 21b, and is input to the negative input terminal of the differential amplifier 23. As a result, the potential of the conductor 20b is a value obtained by reducing a voltage drop amount by the faulty point 22 from the potential of the conductor 20a.

When the resistance value of the faulty point 22 is low, the current flows through the faulty point 22 such that the faulty point 22 can be recognized as a short-circuit fault. On the other hand, when the resistance value of the faulty point 22 is high, for example, is higher than input impedances 27a and 27b of the differential amplifier 23, a current is not likely to flow through the faulty point 22. Accordingly, it is difficult to distinguish between a state where the faulty point 22 is present and a state where the faulty point 22 is not present.

FIG. 3 illustrates images obtained from the sample of FIG. 2. An image 101 on the first stage is a schematic diagram of a SEM image. Since most secondary electrons are generated from an end portion of the sample or the like, an image where an outline of the conductor 20 or the probe 21 is highlighted is obtained. Therefore, when the faulty point 22 is buried in the sample or when the faulty point 22 is not buried in the sample but has no or a very small difference in height from that of the surroundings, the faulty point 22 does not substantially appear in the SEM image in some cases.

Images 102 to 104 on the second stage to the fourth stage are schematic diagrams of EBAC images. The EBAC image 102 is an image when a fault is not present. The conductor 20a and the conductor 20b are not electrically connected. Therefore, by irradiating the conductor 20a with the electron beam 3, there is a potential difference between the conductor 20a and the conductor 20b. Therefore, in the EBAC image 102, there is a clear contrast between the conductor 20a and the conductor 20b.

The EBAC image 103 is an image when the faulty point 22 is a short-circuit fault (low resistance fault). Even when the faulty point 22 does not appear in the SEM image, charge from the electron beam 3 flows to the conductor 20b through the faulty point 22. Therefore, in the EBAC image 103, there is a contrast with gradation at a portion where the faulty point 22 is present. As a result, the faulty point 22 that cannot be identified in the SEM image can be identified in the EBAC image 103. The condition of the gradation varies depending on the length of the conductors 20a and 20b or the faulty point 22, the resistance value of the faulty point 22, or the like.

The EBAC image 104 is an example where it is difficult to identify a fault position in the EBAC image, for example, an image when the faulty point 22 is a high resistance fault. When the resistance of the faulty point 22 is high, the conductor 20a and the conductor 20b are not substantially electrically connected. That is, a current does not substantially flow through the faulty point 22. Therefore, although the faulty point 22 is present, there is substantially the same contrast in the EBAC image 104 as that in the EBAC image 102 when no fault is not present. Further, depending on the resistance value of the faulty point 22, the brightness in the faulty point is substantially the same as that of the surroundings. As a result, it is difficult to identify the position of the fault from the EBAC image.

An object of the present invention is to detect a faulty point caused by capacitive coupling where a change in resistance value is low that is difficult to identify in the EBAC image in the related art or to detect, as a potential faulty point, a point that is electrically normal but spatially close and has a low electrical tolerance.

In addition, another object of the present invention is to reduce electrical noise from a device that appears in an EBAC image obtained by amplifying and imaging a weak signal such as an EBAC signal.

Solution to Problem

A sample inspection apparatus according to one embodiment of the present invention includes: a charged particle optical system configured to irradiate a sample with a charged particle beam; a first probe configured to come into contact with the sample; an amplifier having an input terminal to which the first probe is connected; and a phase detection unit to which an output signal of the amplifier is input, in which an AC voltage is applied to the first probe, and the phase detection unit detects the output signal of the amplifier using a reference signal synchronized with the AC voltage and having the same frequency as the AC voltage.

Advantageous Effects of Invention

Provided is a sample inspection apparatus capable of identifying a capacitive fault or a potential faulty point where an electrical tolerance is low that is difficult to detect until now.

Other objects and new characteristics will be clarified with reference to description of the specification and the accompanying drawings.

BRIEF DESCRIPTION OF DRAWINGS

FIG. 1 is a schematic drawing illustrating a basic configuration of a sample inspection apparatus according to a first embodiment.

FIG. 2 is a diagram illustrating a principle of forming an EBAC image.

FIG. 3 is a schematic diagram illustrating a SEM image and EBAC images obtained from a sample of FIG. 2.

FIG. 4 is a diagram illustrating a fault detection principle by a second detection system.

FIG. 5 is a diagram illustrating a schematic configuration of a phase detection unit.

FIG. 6 is a diagram illustrating polar coordinate conversion in an arithmetic unit.

FIG. 7 is a schematic configuration diagram illustrating a second detection system (first modification example).

FIG. 8 is a schematic configuration diagram illustrating a second detection system (second modification example).

FIG. 9 is a diagram illustrating a state of probe contact for detecting dynamic characteristics of a transistor.

FIG. 10 is a schematic configuration diagram illustrating a second detection system (third modification example).

FIG. 11 is a schematic drawing illustrating a basic configuration of a sample inspection apparatus according to a second embodiment.

FIG. 12 is a schematic drawing illustrating a basic configuration of a sample inspection apparatus according to a third embodiment.

DESCRIPTION OF EMBODIMENTS

Hereinafter, embodiments of the present invention will be described with reference to the drawings.

First Embodiment

FIG. 1 is a schematic drawing illustrating a basic configuration of a sample inspection apparatus according to the present embodiment. The sample inspection apparatus includes: a SEM column 1 for irradiating a sample 19 with an electron beam 3 as a charged particle beam; a sample stage 10 for placing the sample 19; probes 21a and 21b that come into contact with conductors 20a and 20b mainly formed of copper or aluminum on the sample 19 to extract a potential from the conductors 20a and 20b. Here, the two probes are provided. However, for example, when the conductor 20b is grounded, one probe 21a can be provided. Further, three or more probes may be provided.

In the SEM column 1, an electron optical system that irradiates the sample with the electron beam 3 is built. The electron beam 3 emitted from an electron source 2 is focused on the sample 19 through a first focusing lens 5, a second focusing lens 6, a deflection coil 7, an electrical coil 8 for moving the field of view, an objective lens 9, and the like that configure the electron optical system, and scans any position of the sample 19. The scanning of the electron beam 3 is performed when a scanning signal is output from a system control unit 14 to a deflection coil drive unit 12a in an electron beam control unit 12 and the deflection coil drive unit 12a changes the amount of deflection of the electron beam 3 by the deflection coil 7 in accordance with the scanning signal.

The sample inspection apparatus includes a first detection system that forms a SEM image and a second detection system that forms an EBAC image. The first detection system includes a detector 4 that detects secondary particles emitted from the outermost surface of the sample 19 or the probes 21a and 21b when the sample 19 or the probes 21a and 21b are irradiated with the electron beam 3. Although the details are described below, the second detection system includes the probes 21a and 21b, the differential amplifier 23, a phase detection unit 40, and a frequency generator 41.

A control unit 11 includes the electron beam control unit 12 that controls each of the optical elements configuring the electron optical system, an image processing unit 13 that forms a SEM image or an EBAC image from a detection signal from the first detection system or the second detection system, and the system control unit 14 that controls the entire sample inspection apparatus.

In addition, the sample inspection apparatus includes a computer 18. The computer 18 is connected to a keyboard 15 as an input apparatus, a mouse 16 as a pointing apparatus, and an image display unit 17. A user can give an instruction from the computer 18 to the sample inspection apparatus, and can cause the image display unit 17 to display the image formed by the image processing unit 13.

Hereinafter, the acquisition of the EBAC image by the sample inspection apparatus according to the present embodiment will be mainly described.

The image processing unit 13 includes an A/D converter 24, a pixel integration unit 25, and a frame integration unit 26. The second detection system includes the frequency and detects a voltage between the probes 21a and 21b in a state where an AC voltage is applied between the probes 21a and 21b. A detection signal output from the differential amplifier 23 is an AC signal. Therefore, in the phase detection unit 40, the AC signal output from the differential amplifier 23 is converted into a DC signal. The DC signal output from the phase detection unit 40 is converted into digital data by the A/D converter 24. In the pixel integration unit 25, the digital data is converted into a gray value per pixel based on a control signal representing an irradiation position of the electron beam 3, the control signal being input from the system control unit 14 in synchronization with the scanning signal. In the frame integration unit 26, in order to increase the SN ratio of an image to be acquired, the same region on the sample 19 is scanned multiple times, and frame images obtained from every scanning are integrated to form image data. The formed image data is transmitted to the computer 18. The computer 18 causes the image display unit 17 to display the received image data as an EBAC image.

A principle of the fault detection by the second detection system will be described using FIG. 4. The principle of forming the EBAC image in the related art described with reference to FIG. 2 focuses on a resistance component of the faulty point 22. On the other hand, the fault detection principle according to the present embodiment focuses on that the faulty point 22 includes a resistance component and a capacity component. Originally, the conductor 20a and the conductor 20b are electrically insulated from each other. However, an integrated circuit including the conductor 20a and the conductor 20b operates as a circuit at a high speed such that a voltage applied to the conductor 20a and the conductor 20b includes a frequency component. Therefore, when insulating performance between the conductor 20a and the conductor 20b is insufficient, the frequency component of the voltage applied to the faulty point 22 passes through the capacity component of the faulty point 22 to cause a short-circuit fault. The second detection system can detect a fault portion that has a small change in resistance value, is difficult to identify as a fault with the detection method in the related art, and is caused by the capacity component of the faulty point 22 or can detect a potential fault portion that is not a fault at the moment but may become a fault in the future due to a low electrical tolerance.

The frequency generator 41 is connected to the two probes 21a and 21b, applies an AC voltage to the conductor 20a through the probe 21a, and applies an AC voltage to the conductor 20b through the probe 21b. When the faulty point 22 is irradiated with the electron beam 3, the dielectric constant of the faulty point 22 changes due to the effect (for example, a temperature increase) of the irradiation. The change is detected by the differential amplifier 23 as a change in AC voltage between the probes. The size or the frequency of the voltage generated by the frequency generator 41 is set from the system control unit 14, and an appropriate value for detecting a fault can be selected.

FIG. 5 illustrates a configuration of the phase detection unit 40. The output of the differential amplifier 23 includes the frequency component generated by the frequency generator 41. Therefore, when the output is imaged as a signal as it is, the output is converted into an image including the frequency component. Therefore, the phase detection unit 40 extracts a DC component by detecting the output SIG of the differential amplifier 23 using a reference signal REF having the frequency output from the frequency generator 41. Here, the AC voltage generated by the frequency generator 41 is used as it is as the reference signal REF. However, the phase detection unit 40 may include a frequency generator separately to generate the reference signal REF in synchronization with the AC voltage generated by the frequency generator 41.

The phase detection unit 40 includes a phase detector 42, a phase shifter 43, a filter 44, and an arithmetic unit 45. The output signal SIG of the differential amplifier 23 is detected by the phase detector 42 using an applied frequency $f_r$ as a reference, and is converted into a DC signal. The phase detection unit 40 includes two systems of phase detectors 42. A reference signal obtained by allowing the phase shifter 43 to shift the phase of the reference signal REF by 90° is input to one phase detector 42a, and the reference signal REF is input to another phase detector 42b as it is. As a result, the phase detectors 42a and 42b perform the phase detection using the reference signals SIN and COS orthogonal to each other. A noise component in the vicinity of the output signal of the differential amplifier 23 is converted into a component in the vicinity of the DC component by the phase detector 42. Therefore, ripple caused by the noise or the detection is removed by the filter 44 (typically, a low pass filter). The arithmetic unit 45 converts a DC signal Y from the phase detector 42a and a DC signal X from the phase detector 42b into polar coordinates to output an amplitude signal R and a phase signal θ.

The polar coordinate conversion in the arithmetic unit 45 will be described using FIG. 6. The output of the differential amplifier 23 is represented by a vector 110. The size of R cos θ is detected as an output signal X of the phase detector 42b, and the size of R sin θ is detected as an output signal Y of the phase detector 42a. Accordingly, the amplitude signal R and the phase signal θ can be calculated by (Expression 1).

$$R = \sqrt{X^2 + Y^2} \qquad \text{[Expression 1]}$$
$$\theta = \tan^{-1}\frac{Y}{X}$$

The phase detection process to be executed by the phase detection unit 40 of FIG. 5 is the same as two-phase lock-in amplification. Accordingly, the lock-in amplifier may be mounted as the phase detection unit 40. The amplitude signal R is input to the image processing unit 13 such that an EBAC image (hereinafter, referred to as "amplitude image") based on the amplitude signal R can be obtained, and the phase signal θ is input to the image processing unit 13 such that an EBAC image (hereinafter, referred to as "phase image") based on the phase signal θ can be obtained.

Hereinafter, modification examples of the second detection system will be described.

FIG. 7 illustrates a configuration example where the phase of an AC voltage applied to a sample can be changed (first modification example). Using a phase shifter 49, the phase changes between the AC voltage applied to the conductor 20a through the probe 21a and the AC voltage applied to the conductor 20b through the probe 21b. Here, the phase shifter 49 is provided on the probe 21b side but may be provided on the probe 21a side. The system control unit 14 controls the amount of delay by the phase shifter 49 such that (1) an AC voltage having the same phase (0°) is applied and (2) an AC voltage having the opposite phase (180°) is applied, and further interrupts the output from the phase shifter 49 such that (3) an AC voltage is applied to one probe (in this case, only the probe 21a). This way, the system control unit 14 can switch between the phases.

(1) When the AC signal having the same phase is applied, a noise having the same phase that is generated by the frequency generator 41 and is applied through the probes 21a and 21b can be canceled by the differential amplifier 23. Therefore, there is an advantageous effect in that a change of the faulty point 22 can be detected with high sensitivity. By increasing the detection sensitivity, the possibility of detecting the faulty point 22 can be increased even when the faulty point 22 is not present between the conductor 20a and the conductor 20b as illustrated in FIG. 7.

Typically, a point where a fault is present is estimated, and contact positions of the probes 21a and 21b are determined such that the faulty point 22 is interposed between the probes 21a and 21b. It is assumed that this estimation has error, for example, the faulty point 22 is connected to the conductor 20a but is not in contact with the conductor 20b. In this case, a change caused when the faulty point 22 is irradiated with the electron beam 3 is expressed in the probe 21a but is not expressed in the probe 21b. Therefore, a change in the AC voltage between the probes input to the differential amplifier 23 is less than that when the probes are in contact with the faulty point such that the faulty point is appropriately interposed between the probes. However, even in this case, the possibility of detecting a fault can be increased by increasing the sensitivity.

(2) When the AC signal having the opposite phase is applied, a voltage that is at most two times that when the AC signal having the same phase is applied can be applied to the faulty point 22. Therefore, a change during the irradiation of the electron beam 3 is highly likely to occur. This configuration is effective for a case where a symptom of fault is more likely to appear as the applied voltage increases.

(3) In order to detect a change when the AC voltage is applied to only one side of the faulty point 22 without being applied to the other side of the faulty point 22, the AC voltage is applied to only one probe. When the faulty point 22 is leaked to a ground electrode (GND), the detection method of applying the AC voltage to only one side of the faulty point 22 is effective.

The phase of the AC voltage applied to the faulty point 22 can be switched such that a state where a fault is most easily detected can be set on depending characteristics of the faulty point.

FIG. 8 illustrates a configuration example where the waveform of the AC voltage to be applied is adjusted to a square wave using a frequency generator 50 (second modification example). Here, the example where the frequency generator in the circuit configuration of FIG. 7 is changed is illustrated. However, this change is also applicable to the circuit configuration of FIG. 5. When the circuit to be applied is not particularly limited or when there is no contradiction in principle, the embodiments and the modification examples can be combined or replaced. The same can be applied to the following embodiments and modification examples.

By changing the waveform of the AC voltage applied to the probe 21 to a square wave, the frequency applied to the faulty point 22 includes a large amount of harmonic component. By applying the square wave including a large amount of harmonic component instead of increasing the frequency of the AC voltage having a sine wave, the presence of the faulty point 22 can be visualized without adjusting the fundamental frequency of the square wave not to be high that much.

In this modification example, dynamic characteristics of a transistor can be visualized as an EBAC image. In this case, as schematically illustrated in FIG. 9, the probes 21a and 21b are brought into contact with a gate G and a drain D of a transistor, and the AC voltage having a square wave is applied. As the fundamental frequency of the AC voltage increases, a transistor having faulty dynamic characteristics follows a change in gate voltage, and a drain current cannot be caused to flow. By detecting a voltage change caused by a channel current of the transistor using the probes 21a and 21b, the dynamic characteristics of the transistor can be visualized as a contrast in the EBAC image. For example, when an integrated circuit includes transistors connected in parallel, by bringing the probe 21a into contact with gate electrodes of the transistors connected in parallel and bringing the probe 21b into contact with drain electrodes of the transistors, a variation in the dynamic characteristics of the transistors can be determined from the EBAC image.

FIG. 10 illustrates a configuration example where the differential amplifier 23 is not used (third modification example). Even without applying the AC voltage to opposite ends of the faulty point as described regarding the first modification example, by simply applying the AC voltage to one side of the faulty point, a short-circuit fault caused by capacity may occur. For example, when the end portion to which the voltage is not applied is electrically opened or is fixed to a ground potential (GND), the faulty point 22 can be detected by applying the AC voltage to one side of the faulty point. In this case, an amplifier 51 may be a voltage conversion type amplifier or a current amplification type amplifier. As necessary, as illustrated in FIG. 10, by fixing the probe 21b that is not connected to the amplifier 51 to the ground potential (GND) and bringing the probe 21a into contact with the opposite end portion, noise can also be reduced.

Second Embodiment

A sample inspection apparatus according to a second embodiment is illustrated in FIG. 11. A sample is irradiated with the electron beam 3 that is pulsed by a pulse generator 58, and the output signal from the differential amplifier 23 is detected by synchronous detection using a frequency signal from the pulse generator 58. By turning on and off the electron beam 3, the frequency signal output from the pulse generator 58 is a square wave. This way, an electron microscope that acquires a SEM image while turning on and off the electron beam 3 is known as a pulse SEM.

In the second embodiment, by acquiring an EBAC image using the pulse SEM, a capacitive fault having the same frequency characteristics as the pulsed electron beam is detected. The electron optical system includes a blanking mechanism for the electron beam 3, the electron beam control unit 12 blanks the electron beam 3 using the ON/OFF waveform from the pulse generator 58, and the sample is irradiated with the pulsed electron beam 3. By applying the same frequency signal (ON/OFF waveform) to the faulty point 22 using the probes 21a and 21b and detecting the output signal of the differential amplifier 23 using the same frequency signal, the EBAC image is acquired. While shifting the phase of the frequency signal generated by the pulse generator 58, a plurality of EBAC images are acquired and superimposed on each other such that a capacitive fault can be acquired with a high S/N. For example, when the duty ratio of the frequency signal generated by the pulse generator 58 is 33%, images are acquired while shifting the phase three times. As a result, an image with the same S/N ratio as that when the electron beam 3 is emitted as a continuous beam can be obtained.

Here, the frequency signal generated by the pulse generator 58 is used as it is as the AC voltage applied to the probe or the reference signal input to the phase detection unit. The second detection system may include a frequency generator separately to generate the AC voltage or the reference signal REF synchronized with the AC voltage generated by the pulse generator 58 and having the same frequency as the frequency signal.

As in the first embodiment, the amplitude signal R is input to the image processing unit 13 such that an EBAC image (hereinafter, referred to as "amplitude image") based on the amplitude signal R can be obtained, and the phase signal $\theta$ is input to the image processing unit 13 such that an EBAC image (hereinafter, referred to as "phase image") based on the phase signal $\theta$ can be obtained.

As in the first modification example of the first embodiment, FIG. 11 illustrates the configuration in which, using the phase shifter 49, the phase changes between the AC voltage applied to the conductor 20a through the probe 21a and the AC voltage applied to the conductor 20b through the probe 21b. However, a configuration in which the phase shifter 49 is removed can be also be adopted. As in the third modification example of the first embodiment, the probe can be brought into contact with one side of the faulty point 22, and a voltage conversion a current type amplifier or amplification type amplifier can also be used instead of the differential amplifier 23.

Third Embodiment

In the third embodiment, the AC voltage is not applied to the probe 21 unlike the above-described embodiments and the modification examples. As in the EBAC image in the related art, the DC signal is output from the differential amplifier 23, but an object of the third embodiment is to obtain a clearer EBAC image by performing the phase detection process.

During the acquisition of the EBAC image, the scan speed of the electron beam 3 has a large effect on image quality and fault detection performance. In addition, the image resolution of the EBAC image depends on the number of pixels. Accordingly, a sampling rate that is a reciprocal of an electron beam irradiation time per pixel of the EBAC image has a large effect on a condition of fault detection by the EBAC image. Therefore, by acquiring the EBAC image multiple times in advance while changing the sampling rate, a sampling rate at which a fault appears significantly is searched for in general.

The absorbed current is a weak current, and thus the amplification factor by the differential amplifier 23 is also large. Therefore, various noises generated by the sample inspection apparatus can also be amplified at the same time, and thus the output signal from the differential amplifier 23 is buried in the noise. A signal having a single frequency can be extracted by the phase detection, and thus the weak signal caused by the absorbed current can be extracted by appropriately selecting a frequency used for the phase detection. As a result, a clearer EBAC image can be obtained.

FIG. 12 illustrates a sample inspection apparatus that searches for a sampling rate appropriate for each fault and further automatically set the frequency generated by the frequency generator 41 for the phase detection based on the sampling rate.

When the user determines a condition for acquiring the EBAC image, the computer 18 calculates the sampling rate based on the acquisition condition. The system control unit 14 outputs the scanning signal to the electron beam control unit 12 and scans the electron beam 3 at the calculated sampling rate. In addition, the system control unit 14 instructs the frequency generator 41 to generate the reference signal REF having the frequency used for the phase detection that is predetermined based on the calculated sampling rate, and the phase detection unit 40 detects the output of the differential amplifier 23 using the reference signal REF from the frequency generator 41.

The system control unit 14 sets the frequency used for the phase detection to a value higher than or equal to the sampling rate. The reason for this is follows. When the frequency used for the phase detection is the sampling rate or lower, noise having a lower frequency than the sampling rate is reflected as it is on the pixel value. By performing the phase detection at a frequency higher than the sampling rate, a signal having a plurality of periodic fluctuations per pixel is detected, and noise is averaged for each pixel.

As in the other embodiments, the amplitude signal R is input to the image processing unit 13 such that an EBAC image (hereinafter, referred to as "amplitude image") based on the amplitude signal R can be obtained, and the phase signal $\theta$ is input to the image processing unit 13 such that an EBAC image (hereinafter, referred to as "phase image") based on the phase signal $\theta$ can be obtained.

The signal that is detected by the phase detection is limited to a bandwidth having a narrow spatial frequency. Therefore, typically, when a bright point (a point where the signal is strong or weak) appears in the EBAC image, a bright portion appears around the bright point. In the present embodiment, a signal in a frequency band other than the frequency used for the phase detection is reduced such that the size of the faulty point in the EBAC image can be minimized. That is, the faulty point can be narrowed, that is, can be minimized.

In the example of FIG. 12, as the differential amplifier 23, a voltage application type differential amplifier where a predetermined voltage is applied between two input terminals from a voltage source 55 is used. However, the present invention is not limited to this example, a differential amplifier that is not provided in the voltage source 55 may be used. Further, when one probe is used, a voltage conversion type amplifier or a current amplification type amplifier illustrated in FIG. 10 may also be used instead of the differential amplifier.

REFERENCE SIGNS LIST

1: SEM column
2: electron source
3: electron beam
4: detector
5: first focusing lens
6: second focusing lens
6: deflection coil
8: electrical coil for moving field of view
9: objective lens
10: sample stage
11: control unit
12: electron beam control unit
12a: deflection coil drive unit 13: image processing unit
14: system control unit
15: keyboard
16: mouse
17: image display unit
18: computer
19: sample
20a, 20b: conductor
21a, 21b: probe
22: faulty point
23: differential amplifier
24: A/D converter
25: pixel integration unit
26: frame integration unit
27a, 27b: input impedance
40: phase detection unit
41: frequency generator
42: phase detector
43: phase shifter
44: filter
45: arithmetic unit
49: phase shifter
50: frequency generator
51: amplifier
55: voltage source
58: pulse generator
101: SEM image
102, 103, 104: EBAC image
110: vector

The invention claimed is:

1. A sample inspection apparatus comprising:
a charged particle optical system configured to irradiate a sample with a charged particle beam;
a first probe configured to come into contact with the sample;
an amplifier having an input terminal to which the first probe is connected; and
a phase detection unit to which an output signal of the amplifier is input,
wherein an AC voltage is applied to the first probe, and the phase detection unit detects the output signal of the amplifier using a reference signal synchronized with the AC voltage and having the same frequency as the AC voltage.

2. The sample inspection apparatus according to claim 1, further comprising:
a system control unit;
a first detection system including a detector configured to detect secondary particles emitted when the sample is irradiated with the charged particle beam;
a charged particle control unit configured to control the charged particle optical system; and
an image processing unit configured to form an image from an output signal input from the first detection system or a second detection system including the first probe, the amplifier, and the phase detection unit,
wherein the system control unit outputs a scanning signal that causes the charged particle control unit to scan the sample with the charged particle beam, and
the image processing unit forms the image by calculating a gray value per pixel from a detection signal input from the first detection system or the second detection system based on a control signal input from the system control unit in synchronization with the scanning signal.

3. The sample inspection apparatus according to claim 2, wherein the phase detection unit converts the output signal of the amplifier into polar coordinates to output an amplitude signal and a phase signal, and
the second detection system outputs the amplitude signal or the phase signal to the image processing unit.

4. The sample inspection apparatus according to claim 3, wherein the phase detection unit includes
a first phase detector to which the output signal of the amplifier and the reference signal are input,
a second phase detector to which the output signal of the amplifier and a signal obtained by phase-shifting the reference signal by 90° are input, and
an arithmetic unit configured to calculate the amplitude signal and the phase signal from a first DC signal output from the first phase detector and a second DC signal output from the second phase detector.

5. The sample inspection apparatus according to claim 2, wherein the second detection system includes a frequency generator configured to generate the AC voltage, and
the system control unit sets a voltage and a frequency of the AC voltage generated by the frequency generator.

6. The sample inspection apparatus according to claim 5, wherein the second detection system further includes a second probe configured to come into contact with the sample and to apply the AC voltage to the sample,
the amplifier is a differential amplifier, and
the first probe and the second probe are connected to input terminals of the differential amplifier, respectively.

7. The sample inspection apparatus according to claim 6, wherein the second probe is connected to the frequency generator through a phase shifter, and
the system control unit controls the phase shifter such that a phase of the AC voltage applied to the second probe is the same as or opposite to a phase of the AC voltage applied to the first probe or such that the AC voltage applied to the second probe is interrupted.

8. The sample inspection apparatus according to claim 5, wherein the frequency generator generates the AC voltage as a square wave.

9. The sample inspection apparatus according to claim 2, further comprising a pulse generator configured to generate a frequency signal as a square wave,
wherein the charged particle control unit controls the charged particle optical system such that the charged particle beam is pulsed and emitted to the sample based on the frequency signal, and
the AC voltage synchronized with the frequency signal and having the same frequency as the frequency signal is applied to the first probe, and the phase detection unit detects the output signal of the amplifier using the reference signal synchronized with the frequency signal and having the same frequency as the frequency signal.

10. A sample inspection apparatus comprising:
a charged particle optical system configured to irradiate a sample with a charged particle beam;
a first probe configured to come into contact with the sample;
an amplifier having an input terminal to which the first probe is connected;
a frequency generator configured to generate a reference signal;
a phase detection unit configured to detect an output signal of the amplifier using the reference signal generated by the frequency generator;
a system control unit;
a charged particle control unit configured to control the charged particle optical system; and an image processing unit configured to form an image from an output signal input from the phase detection unit, wherein the system control unit outputs a scanning signal that causes the charged particle control unit to scan the sample with the charged particle beam, the image processing unit forms the image by calculating a gray value per pixel from a detection signal input from the phase detection unit based on a control signal input from the system control unit in synchronization with the scanning signal, and the system control unit sets a frequency of the reference signal generated by the frequency generator to a value higher than or equal to a sampling rate that is a reciprocal of an electron beam irradiation time per pixel of the image.

11. The sample inspection apparatus according to claim 10, further comprising a second probe configured to come into contact with the sample, wherein the amplifier is a differential amplifier, and the first probe and the second probe are connected to input terminals of the differential amplifier, respectively.

12. The sample inspection apparatus according to claim 11, wherein a predetermined DC voltage is applied between the input terminals of the differential amplifier.

\* \* \* \* \*